Patented Apr. 11, 1939

2,154,079

UNITED STATES PATENT OFFICE 2,154,079

CATALYST AND METHOD OF PRODUCING IT

John Morris Weiss, New York, N. Y., assignor to Calorider Corporation, Greenwich, Conn., a corporation of Connecticut No Drawing. Application October 20, 1936, Serial No. 106,572

9 Claims. (Cl. 23—234)

This invention lies within the field of catalysis where catalytic materials are coated on or incorporated with supports, and relates to a new supporting material or carrier and catalysts made therewith.

In catalytic work generally and in vapor phase heterogeneous catalysis, especially, it has not been general practice to use a catalyst per se in carrying out reactions but rather to coat the catalytic material on a support or carrier so as to reduce the amount of catalytic material required. This is especially true when the catalytic material is one of high first cost. These catalytic reactions, such as the partial oxidation of organic compounds in the vapor phase, are often high temperature reactions where the catalyst temperatures may be well above incipient red heat. It is therefore essential that the catalytic support be a material of high fusing point. It is further desirable that it be somewhat porous and rough in surface so that the catalytic coating will adhere to it. Moreover, it should be of sufficient integral strength so that granules of the support will not tend to break up in the coating operation or in use. Also, it is an advantage to be able to prepare the support in moulded form of uniform and predetermined size and shape. Of greatest importance, however, is the requirement that the carrier shall not affect the catalytic coating so as to render it less efficient for the reaction being carried on.

It has been recognized in many instances that silica ($SiO_2$) is an excellent material for catalytic supports since it is quite inert, is infusible far above usual catalyst temperatures, and possesses good mechanical strength. Quartz granules have therefore been suggested and used, but their usual smooth glassy surface is not conducive to good adherence of the catalytic coating. Attempts have been made to roughen quartz surfaces by etching or by some mechanical means, and although this somewhat improves the adherence of catalytic coatings, the results are by no means satisfactory.

Silica gels, produced by the acidification of alkaline silicates, have also been used. These however possess a serious disadvantage in that the complete removal of the salts formed is difficult and such residual salts may affect the action of the catalytic agent employed. For this and other reasons, silica gels, prepared from alkali metal silicates, have proven unsatisfactory as carriers for catalytic materials in many organic partial oxidation reactions. The use of silica, precipitated from alkali metal silicates, as a binding agent, as described in U. S. Patent 1,952,057, is open to the same objection.

The ideal is to produce a carrier where no extraneous materials are introduced which might affect the action of the catalyst, and I have accomplished this in a new and efficient manner. I have found that I can obtain all the desirable catalyst carrier characteristics heretofore set forth by using organic silicon compounds, preferably organic silicates such as ethyl silicate, as a binding agent for finely divided silica, and thereby produce a catalyst carrier which can be shaped as desired, which is porous, possesses a rough surface, is infusible and is free from impurities, which might affect the action of the catalyst. By using organic silicon compounds such as alkyl silicates as a binding medium, the residue on decomposition is a pure silica. After such decomposition, all the organic portion is readily volatilized on heating so that there is no residue of inorganic salts requiring removal to produce a satisfactory catalytic product. If the organic silicate is used to bind a pure comminuted silica, the resulting finished mass is entirely silica. Although my invention is not limited to the binding of pure silica, yet it is one of the important results of my invention that a pure silica carrier which can be moulded and which possesses suitable porosity is now made available as a catalyst carrier.

In order to clearly point out the invention, the following examples are set forth, but it is not my intention that the scope of my invention shall be limited by these examples but only the claims appended hereto.

Example I

Ethyl silicate was mixed in the proportion of 300 parts by volume with 5.6 parts of water and 175 parts of 95% alcohol, together with about 0.1 part of concentrated hydrochloric acid. On mixing, a moderate temperature rise was noted. After standing about 24 to 48 hours, 51 parts by volume of water were added and the resulting partially hydrated ethyl silicate solution used as the bonding medium.

Powdered pure silica was washed with a mixture of strong nitric and hydrochloric acid to remove soluble impurities, then washed with water until free of acid, and finally dried. Two sizes of silica were used. One was a fine grade with the following sieve test:

|  | Per cent |
|---|---|
| Through 100 mesh on 250 mesh | 0.4 |
| Through 250 mesh on 325 mesh | 4.0 |
| Through 325 mesh | 95.6 |

The other was a coarser material and showed a sieve test as follows:

|  | Per cent |
|---|---|
| Through 10 mesh on 20 mesh | 2.2 |
| Through 20 mesh on 30 mesh | 30.8 |
| Through 30 mesh on 40 mesh | 0.4 |
| Through 40 mesh on 60 mesh | 17.4 |
| Through 60 mesh on 80 mesh | 0.2 |
| Through 80 mesh on 100 mesh | 10.8 |
| Through 100 mesh | 38.2 |

A mixture was made of 130 parts by weight of the finer grade of silica with 55 parts of the coarser grade. Then 42 parts by weight of the partially hydrolyzed ethyl silicate solution were added and thoroughly mixed in, troweling until a smooth even mix was obtained. On smoothing out into a layer about ⅜" thick and allowing to set for 48 hours, a hard insoluble mass was obtained which could be broken up and sized to hard, rough firm granules, which had a very considerable degree of porosity. The granules were unaffected by treatment with boiling hydrochloric and nitric acids and had all the physical characteristics desired in catalyst carriers, being infusible at temperatures far above those employed in most catalytic reactions and consisting essentially of a uniform, strong porous mass, comprised of pure silica.

Alternately the mixture before hardening was formed into pellets in a pellet plate or other suitable device and allowed to harden after such formation. In such case it was desirable to repeat the acid wash on the pellets after formation to remove any surface impurities which may have been introduced by the mould used.

Granules, formed as described, were coated with vanadium oxide prepared from an ammonium meta vanadate solution by acidification with nitric acid and heating. For every 100 parts by weight of vanadium oxide, about 475 parts of C. P. concentrated hydrochloric acid were added and the mix heated and partially evaporated to form a solution of vanadyl chloride. Then approximately 800 parts of the granules were added and the evaporation continued to dryness, stirring so as to coat the granules during the operation. Such catalysts may also be prepared from alkaline solutions of vanadium oxide and in either case, agents to modify the action of the vanadium oxide may be introduced if desired.

Such catalysts have been used in the vapor phase partial oxidation of organic compounds, the vapor of the organic compound being mixed with an oxygen containing gas, such as air, and passed over the catalyst at an elevated temperature. As examples of such oxidation processes, I may mention the production of maleic acid from benzene, the production of phthalic anhydride from naphthalene, the production of anthraquinone from anthracene, and the production of benzaldehyde or benzoic acid from toluene.

*Example II*

Silica powder (200–300 mesh size) was washed with strong nitric and hydrochloric acid to remove soluble impurities. Fine infusorial earth was given a similar acid treatment. Both products were leached free of acid and dried. A mixture was then made of 25 parts by weight of the washed silica, 30 parts by weight of the washed infusorial earth and 50 parts by weight of the partially hydrolyzed ethyl silicate solution, prepared as previously described. As soon as the materials were mixed to a thick paste, the paste was pelleted in a suitable device and the pellets, after moulding, were allowed to air dry and season for several days to complete the hydrolysis of the ethyl silicate and thus develop sufficient strength. After this seasoning, the pellets were acid washed to remove impurities introduced by the mould, the acid leached out and the pellets dried. They formed a uniform, strong, highly porous mass, consisting essentially of pure silica, and were infusible at temperatures far above those employed in organic partial oxidations. These pellets were of a very high degree of porosity and were found to absorb about 35 to 40% of their weight when immersed in water. They are therefore suitable for carriers where a very considerable degree of impregnation of the catalytic material is desired. They may be coated with vanadium oxide in the same manner as was described under Example I. Other methods of coating may be employed and the invention is not limited to any specific method of applying the catalytic material to the carrier.

I also do not intend to limit myself to silica bound by ethyl silicate or other organic silicates. Other comminuted inert materials such as aluminum oxide may be formed into shapes of high porosity and strength in a similar fashion. The question of the inertness of the fillers used is dependent on the particular catalytic operation contemplated as it is well known that a material may be inert in one system and active in another one. It is however common to all the carriers of my invention that they are intended for use in reactions where pure silica is within the class of an inert substance.

In all cases, pelleting or shaping may be substituted by forming into larger masses which after hardening can be broken and sized as desired, without departing from the spirit and scope of my invention. The particles of inert filler used may vary widely in size depending on the character desired in the finished carrier. The amount of organic silicate required will of course vary with the type and size of the inert particles or active catalytic materials subjected to my process and the degree of strength desired.

In the claims, the term organic silicate is intended to include ethyl silicate or other suitable organic silicates, either as such or after partial hydrolysis.

Having thus described my invention, I claim:

1. The process of producing a catalyst for use in the vapor phase partial oxidation of organic compounds, comprising combining an organic silicon compound with comminuted catalytically inert material selected from the group of silica and alumina, causing the silica of said organic silicon compound to become regenerated so as to form a binder for said inert material and subsequently causing a coating of a catalytically active metallic oxide to be formed thereon.

2. The process of producing a catalyst for use in the vapor phase partial oxidation of organic compounds, comprising combining ethyl silicate with comminuted catalytically inert material selected from the group of silica and alumina, causing the silica of said ethyl silicate to become regenerated so as to form a binder for said inert material and subsequently causing a coating of vanadium oxide to be formed thereon.

3. The process of producing a catalyst for use in the vapor phase partial oxidation of organic compounds, comprising combining ethyl silicate with comminuted silica, causing the silica of said ethyl silicate to become regenerated so as to form a binder for said comminuted silica and subsequently causing a coating of vanadium oxide to be formed thereon.

4. A catalyst for the vapor phase partial oxidation of organic compounds, comprising catalytically inert material selected from the group of silica and alumina, bonded by alkali-free silica and coated with a metallic oxide which is effective in promoting the partial oxidation of said organic compounds.

5. A catalyst for the vapor phase partial oxidation of organic compounds, comprising catalytically inert material selected from the group of silica and alumina, bonded by alkali-free silica regenerated from ethyl silicate and coated with vanadium oxide.

6. A catalyst for the vapor phase partial oxidation of organic compounds, comprising comminuted silica, bonded by alkali-free silica and coated with vanadium oxide.

7. A catalyst for the vapor phase partial oxidation of aromatic hydrocarbons, comprising catalytically inert material selected from the group of silica and alumina, bonded by alkali-free silica regenerated from ethyl silicate and coated with vanadium oxide.

8. A catalyst for the vapor phase partial oxidation of aromatic hydrocarbons to acid anhydrides, comprising catalytically inert material selected from the group of silica and alumina, bonded by alkali-free silica regenerated from ethyl silicate and coated with vanadium oxide.

9. A catalyst for the vapor phase partial oxidation of benzene to maleic anhydride, comprising catalytically inert material selected from the group of silica and alumina, bonded by alkali-free silica regenerated from ethyl silicate and coated with vanadium oxide.

JOHN MORRIS WEISS.